US009968027B2

(12) United States Patent
Kirk et al.

(10) Patent No.: US 9,968,027 B2
(45) Date of Patent: May 15, 2018

(54) AUTOMATED CONTROL SYSTEMS AND METHODS FOR UNDERGROUND CROP HARVESTERS

(71) Applicants: CLEMSON UNIVERSITY, Clemson, SC (US); AMADAS INDUSTRIES, INC., Suffolk, VA (US)

(72) Inventors: Kendall R. Kirk, Pendleton, SC (US); J. Warren White, Suffolk, VA (US); Joel S. Peele, Suffolk, VA (US); W. Scott Monfort, Aiken, SC (US); Hunter F. Massey, Liberty, SC (US); James S. Thomas, Denmark, SC (US); Stanley A. Brantley, Suffolk, VA (US); Andrew C. Warner, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days. days.

(21) Appl. No.: 15/209,938

(22) Filed: Jul. 14, 2016

(65) Prior Publication Data

US 2017/0013773 A1    Jan. 19, 2017

Related U.S. Application Data

(60) Provisional application No. 62/192,287, filed on Jul. 14, 2015.

(51) Int. Cl.
*A01D 29/00* (2006.01)
*G01S 19/00* (2010.01)
(Continued)

(52) U.S. Cl.
CPC ............ *A01B 79/005* (2013.01); *A01D 29/00* (2013.01); *G01S 19/13* (2013.01); *G01S 19/14* (2013.01)

(58) Field of Classification Search
CPC ......... A01D 29/00; G01S 19/00; G01S 19/13; G01S 19/14; A01B 79/00; A01B 79/005
See application file for complete search history.

(56) References Cited

U.S. PATENT DOCUMENTS 3,469,634 A    9/1969  Whitesides
3,565,178 A    2/1971  Whitfield
(Continued)

FOREIGN PATENT DOCUMENTS

WO    WO2014/197973 A1    12/2014

OTHER PUBLICATIONS

Fravel, et al.; "Development and Testing of an Impact Plate Yield Monitor for Peanuts," 2013 ASABE Annual International Meeting; Paper No. 1620969, Jul. 21-24, 2013, (10 pages).

(Continued)

*Primary Examiner* — Yonel Beaulieu

(57) ABSTRACT

Methods and devices for automated adjustment of a digging implement during harvest of underground crops are described. Utilizing the devices, a digging implement, e.g., a blade, can be located and maintained at a desired depth as a harvester travels across a field. During use, the digging implement depth controls can be varied as the harvester travels within a single field under different operating conditions, e.g., different soil friability, consistency, etc., thereby preventing crop loss and improving crop yield.

20 Claims, 5 Drawing Sheets

(51) Int. Cl.
*G01S 19/13* (2010.01)
*G01S 19/14* (2010.01)
*A01B 79/00* (2006.01)

(56) References Cited

U.S. PATENT DOCUMENTS

| | | | |
|---|---|---|---|
| 3,595,078 A | 7/1971 | Beck | |
| 3,796,268 A * | 3/1974 | Porter | A01D 45/00 171/28 |
| 3,999,613 A * | 12/1976 | Porter | A01D 45/006 171/14 |
| 4,230,188 A | 10/1980 | Paulk | |
| 4,280,419 A | 7/1981 | Fischer | |
| 4,385,353 A * | 5/1983 | Schneider | A01B 63/1117 172/2 |
| 4,560,008 A * | 12/1985 | Carruthers | A01D 15/04 171/130 |
| 4,694,641 A * | 9/1987 | Porter | A01D 45/006 171/28 |
| 4,765,190 A | 8/1988 | Strubbe | |
| 4,821,637 A | 4/1989 | Viaud | |
| 4,933,589 A | 6/1990 | Strubbe | |
| 5,282,389 A | 2/1994 | Faivre et al. | |
| 5,343,761 A | 9/1994 | Myers | |
| 5,505,267 A * | 4/1996 | Orbach | B60K 23/04 172/3 |
| 5,585,626 A | 12/1996 | Beck et al. | |
| 5,739,429 A | 4/1998 | Schmitkons et al. | |
| 5,802,489 A * | 9/1998 | Orbach | B60K 23/08 172/3 |
| 5,887,669 A | 3/1999 | Ostler et al. | |
| 5,984,017 A * | 11/1999 | Packham | A01B 49/02 172/1 |
| 6,003,387 A | 12/1999 | Larson et al. | |
| 6,024,178 A * | 2/2000 | Pickett | A01D 45/22 171/1 |
| 6,068,059 A * | 5/2000 | Bajema | A01D 33/12 171/130 |
| 6,073,550 A | 6/2000 | Goossen et al. | |
| 6,144,910 A * | 11/2000 | Scarlett | A01B 63/023 172/4.5 |
| 6,192,664 B1 | 2/2001 | Missotten et al. | |
| 6,223,848 B1 | 5/2001 | Young et al. | |
| 6,272,819 B1 | 8/2001 | Wendte et al. | |
| 6,431,981 B1 | 8/2002 | Shinners et al. | |
| 6,460,008 B1 | 10/2002 | Hardt | |
| 6,525,276 B1 | 2/2003 | Vellidus et al. | |
| 6,675,561 B2 | 1/2004 | Davis et al. | |
| 6,809,821 B2 | 10/2004 | Thomasson et al. | |
| 6,820,459 B2 | 11/2004 | Beck et al. | |
| 6,988,857 B2 | 1/2006 | Kroemmer et al. | |
| 7,159,523 B2 * | 1/2007 | Bourgault | A01C 7/06 111/187 |
| 7,249,449 B2 | 7/2007 | Goering et al. | |
| 7,743,590 B1 | 6/2010 | Gidden et al. | |
| 7,815,001 B2 | 10/2010 | Liljeblad et al. | |
| 7,873,456 B2 | 1/2011 | Erdmann et al. | |
| 8,504,310 B2 | 8/2013 | Landphair et al. | |
| 8,849,523 B1 * | 9/2014 | Chan | G01S 13/89 111/149 |
| 9,265,192 B2 * | 2/2016 | Chan | G01S 13/89 |
| 9,282,693 B2 * | 3/2016 | Anderson | A01B 79/005 |
| 2007/0039303 A1 | 2/2007 | Mitchel | |
| 2013/0317696 A1 | 11/2013 | Koch et al. | |
| 2013/0323452 A1 * | 12/2013 | Wiessner | B44C 1/105 428/41.8 |
| 2014/0012732 A1 * | 1/2014 | Lindores | A01B 79/005 705/37 |
| 2014/0076218 A1 | 3/2014 | Liu | |
| 2014/0365084 A1 * | 12/2014 | Chan | G01S 13/89 701/50 |
| 2015/0163992 A1 * | 6/2015 | Anderson | A01C 21/005 701/50 |
| 2015/0242799 A1 * | 8/2015 | Seki | A01B 79/005 705/7.15 |
| 2016/0109569 A1 * | 4/2016 | Chan | G01S 13/89 239/63 |
| 2016/0162632 A1 * | 6/2016 | Yun | C07G 3/00 506/1 |
| 2016/0180473 A1 * | 6/2016 | Groeneveld | G06Q 50/02 705/7.25 |
| 2016/0309646 A1 * | 10/2016 | Starr | A01C 21/005 |

OTHER PUBLICATIONS

Free, et al.; "Testing of an Impact Plate Yield Monitor for Peanuts: Mounting Configurations and Air Pressure Correction," 2014 ASABE Meeting Presentation, Paper No. 1914021; Jul. 13-16, 2014; (6 pages).

Monfort; Peanut Money-Maker Production Guide—Clemson University—2013, (77 pages).

Omer, et al.; "Comparative Study on Different Peanut Digging Blades," *Agric. Mech. Asia, Afr. Lat. Am.* (Jun. 2001) 32(3) pp. 43-45.

Penirschke, et al.; "Microwave mass flow meter for pneumatic conveyed particulate solids," Conference Paper—Microwave Flow Meter / Internet www.researchgate.net/publication/224564814_Microwave_mass_flow_meter_for_pneumatic_particulate_solids. Dated Jun. 9, 2015 (2 pages).

Roberson; "Improving Harvesting Efficiencies for Peanut Diggers,:" N.C. State University; (downloaded from Web on Aug. 24, 2016); (1 page).

Thomasson, J.A., etal.; "Optical Peanut Yield Monitor Development and Testing ," Publication 2006 American Society of Agricultural and Biological Engineers ISSN 0883-8542, (10 pages).

Warner, et al.; "Variable Depth Peanut Digger: Part I—Design and Testing," 2014 ASABE and CSBE/SCGAB Annual International Meeting; Paper No. 1914163, Jul. 13-16, 2014, (7 pages).

Warner, et al.; "Variable Depth Peanut Digger: Part II—Digging Loss Analysis," 2014 ASABE and CSBE/SCGAB Annual International Meeting; Paper No. 1914272, Jul. 13-16, 2014, (7 pages).

\* cited by examiner

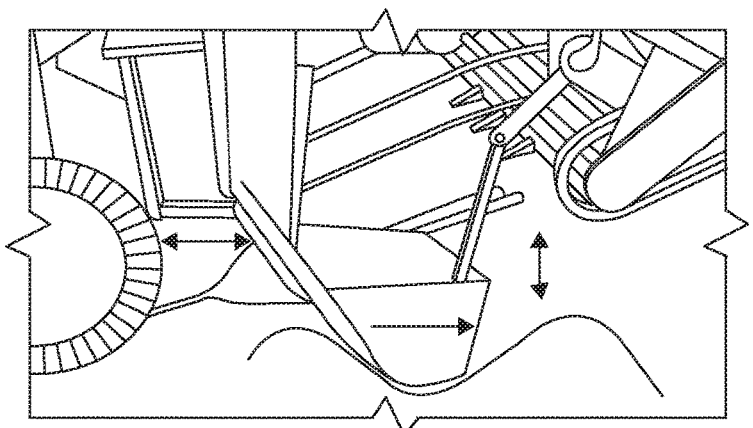
FIG. 4A
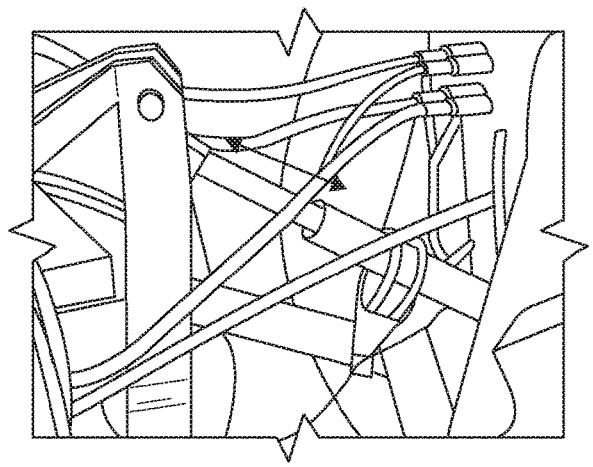
FIG. 4B
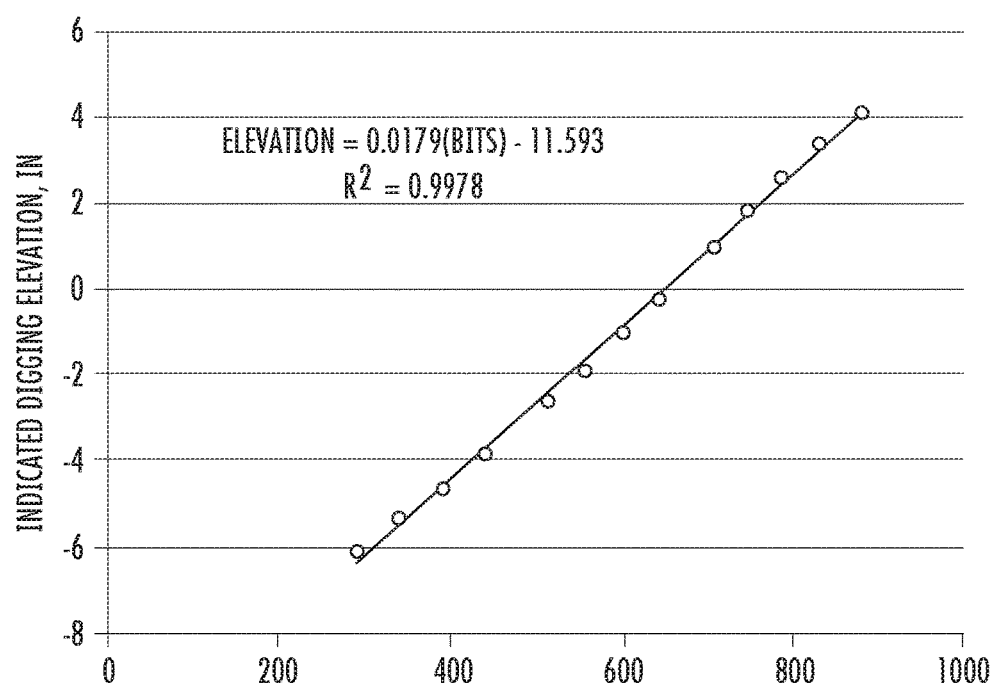
FIG. 5    ROTARY POTENTIOMETER ANALOG VALUE, BITS

AUTOMATED CONTROL SYSTEMS AND METHODS FOR UNDERGROUND CROP HARVESTERS

CROSS REFERENCE TO RELATED APPLICATION

This application claims filing benefit of U.S. Provisional Patent Application Ser. No. 62/192,287 having a filing date of Jul. 14, 2015, which is incorporated herein by reference.

BACKGROUND

As the need for agricultural efficiency and productivity continues to increase, producers must find ways to maximize their crop's potential. Precision agriculture devices and methods are showing great promise in meeting the world's needs for efficient agricultural practices and are becoming a staple in most row crop producers' management strategies, particularly with regard to grains and cereals. The development of precision agriculture devices and methods that would be applicable to the harvest of underground crops could similarly improve crop management and profits.

Initial harvesting (digging) is the highest loss point during cultivation of underground crops such as peanuts, onions, potatoes, sweet potatoes, beets, ginger, garlic, turnips, carrots, rutabagas, and the like. To prevent losses during digging, it is critical that proper settings for the digging implements are maintained across the field. Unfortunately, soil texture (e.g., friability) often varies across a single field, and variation in soil texture can alter the depth of the implement (e.g., the blade) as the harvester travels across the field. For instance, as shown in FIG. 1A, at proper settings for a typical peanut harvester, the blade depth will be such that the taproot is sheared and a moderate amount of soil is carried on the blade as most or all of the pods are harvested. Upon travel into an area of the field in which the soil texture is less friable and harder to cut through, e.g., containing a higher proportion of clay, the same settings will locate the blade too shallow, as shown in FIG. 1B, causing some pods to be sheared and leaving others in the soil. Similarly, if the soil is too soft for the settings, the blade can go too deep (FIG. 1C), causing the taproot to be cut too deep or even ripped from the ground and excessive soil to build up on the blades, which can cause losses by pushing the plants forward before the taproot is severed and prevent proper inversion. Further losses can occur as pods ride over the excessive soil that is mounded on the blades.

Thus, a need exists for control systems and methods that can be used to improve harvesting of underground crops across a variety of soil textures. The successful development of commercially available automated devices and methods will translate to increases in profit in crop production and more sustainable land use.

SUMMARY

In accordance with one embodiment of the present disclosure, a method for harvesting an underground crop is disclosed. More specifically, a method can include obtaining information regarding soil texture (e.g., friability, hardness, moisture content, etc.) in an area and providing that information to a control system. The control system can process that input information and automatically adjust a digging implement of a harvester in response to the information. For instance, the information can be provided in the form of a map of soil texture in the area. A control system can then coordinate the location of the harvester with the map, e.g., via a global positioning system (GPS) and automatically adjust the digging implement to maintain the desired depth. In one embodiment, soil texture information can be provided in real time by use of sensors, e.g., one or more depth gauges, the response of which varies upon variation in soil texture. The sensor response can then be utilized in a control system to maintain the desired implement depth.

In accordance with another embodiment of the present disclosure, a harvester for underground crops is disclosed that includes a digging implement and a control system in communication with the digging implement. The control system can be configured to directly or indirectly automatically adjust some aspect of the digging implement in response to variation in soil texture in an area. For instance, the control system can include components to adjust a linkage arm between the harvester and a tractor, which can alter the angle of the digging implement such that the desired depth of the digging implement is maintained as the harvester travels across an area.

Other features and aspects of the present disclosure are set forth in greater detail below.

BRIEF DESCRIPTION OF THE DRAWINGS

A full and enabling disclosure of the subject matter, including the best mode thereof, directed to one of ordinary skill in the art, is set forth more particularly in the remainder of the specification, which makes reference to the appended figures in which:

FIG. 4 illustrates a depth gauge (FIG. 4A) and a hydraulic top link (FIG. 4B) adjusted in response to the depth gauge determination utilized in one embodiment of a system as described herein.

FIG. 5 presents data and linear regression relating indicated blade location relative to the ground surface to rotary potentiometer value for a depth gauge as described herein.

DETAILED DESCRIPTION

Figure 1A:
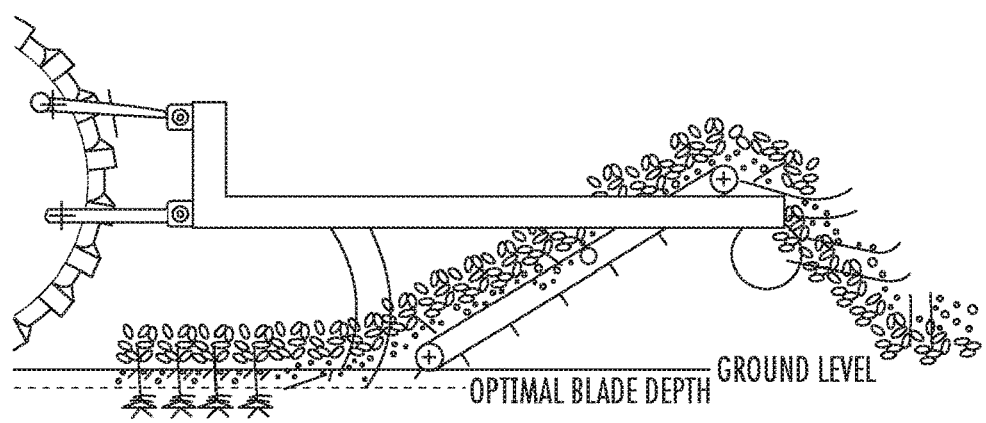
FIG. 1A illustrates a prior art peanut harvester at an optimal blade depth.
Figure 1B:
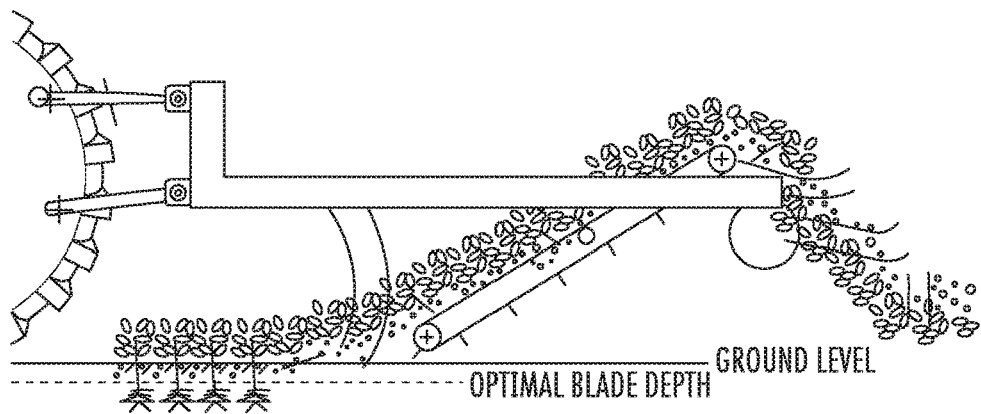
FIG. 1B illustrates a prior art peanut harvester with the blade depth shallower than the optimal depth.
Figure 1C:
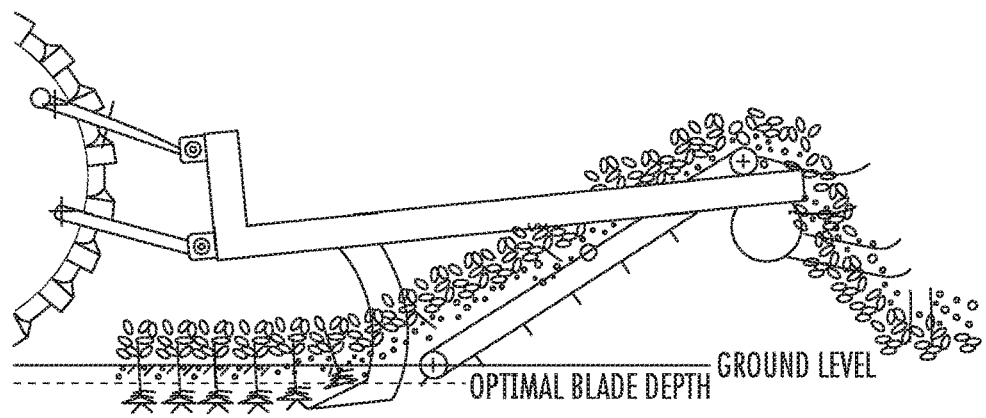
FIG. 1C illustrates a prior art peanut harvester with the blade depth deeper than the optimal depth.

It is to be understood that the terminology used herein is for the purpose of describing particular embodiments only and is not intended to limit the scope of the present disclosure. The present discussion is a description of exemplary embodiments only, and is not intended as limiting the broader aspects of the present invention.

Generally speaking, the present disclosure is directed to methods and devices for automated adjustment of a digging implement during harvest of underground crops. More specifically, utilizing disclosed devices and methods, a digging implement can be located and/or maintained at a desired depth as a harvester travels across a field, and in particular across a field in which soil texture varies throughout the field. As discussed above, when a harvester travels from softer to harder soil, the settings required to locate and maintain a digging blade at the desired depth can change. By use of disclosed devices, the depth controls for the digging implement can be varied 'on the go', or in real time, as the harvester travels across different soil types, preventing crop loss and improving crop yield.

Harvesters as may be utilized with disclosed systems encompass those designed for harvesting underground crops including, without limitation, peanuts, potatoes, sweet potatoes, beets, onions, garlic, ginger, turnips, carrots, rutabagas, and any other crop that is dug (rather than pulled) out of the ground by the action of the harvester. Such harvesters include a tool, generally referred to herein as a digging implement for removing the crop from the ground. While the bulk of this disclosure refers to a blade or a digging blade, it should be understood that any digging implement is encompassed herein, including blades, scoops, forks, lifters, etc. that can be utilized to dig or lift an underground crop out of the ground during harvest. As the harvester moves through a field, the digging implement can be controlled so as to be at a prescribed depth with reference to the ground surface such that it passes beneath the crop (e.g., a peanut pod) and effectively digs the crop from the ground as the harvester passes. The targeted depth of the digging implement during harvest as well as the particular geometry of the implement will obviously vary, depending upon the crop type and the soil type.

A harvester can be designed for use with a tractor or can be self-propelling. For instance, while peanut harvesters (synonymously termed peanut diggers herein) designed for use via a linkage to a tractor are generally discussed throughout this disclosure, the disclosure is by no means to be limited to this particular type of harvester.

According to the present disclosure, a harvester for underground crops can include a control system that is provided input information concerning the soil texture. Soil texture information can include, without limitation, soil friability, soil electrical conductivity, moisture content, presence of incongruities (e.g., stones), particle density, etc. The soil texture information can be processed by the control system to generate an output to directly or indirectly adjust the settings for the digging implement so as to locate and/or maintain the implement at a desired location (e.g., depth or elevation) relative to the soil surface.

Soil texture information can be input to a system as predetermined information; can be determined 'on the go' as a harvester is proceeding across a field, or a combination of both. For instance, mapping of a field can be carried out to relate and map soil texture across a field, and this mapping information can then be provided as input to a control system prior to harvesting of the field.

Soil texture mapping can be carried out according to any suitable methodology. By way of example, and without limitation, soil characteristics across a field can be mapped by electrical conductivity analysis, conventional sampling (e.g., hydrometer tests) and chemical analysis methods, by use of optical methods (e.g., infrared (IR) or near IR analysis, reflectance, aerial image analysis, etc.), mechanical methods (e.g., soil penetrometer probes measuring insertion force, particle size analysis), etc., as well as combinations of analysis methods.

Soil electrical conductivity (EC) is a measurement that is known to correlate with soil properties including various aspects of soil texture, cation exchange capacity (CEC), drainage conditions, organic matter level, salinity, and subsoil characteristics. In one embodiment, soil texture of a field can be mapped for use as described herein by mapping of EC of the soil. EC can be mapped by use of either a contact or non-contact sensor type. Briefly, a contact-type EC sensor can use coulters as electrodes to make contact with the soil and to measure the electrical conductivity. In this approach, two or three pairs of electrodes can be mounted on a toolbar; one pair functions as transmitting electrodes to provide electrical current into the soil while the other pair(s) function as receiving electrodes to measure the voltage drop between the transmitting and receiving electrodes. During the mapping, the soil EC information can be recorded in a data logger along with location information that can be provided to the data logger by use of a GPS. A contact sensor can be utilized in one embodiment as it can be conducive to mapping large areas quickly and it exhibits little susceptibility to outside electrical interference. Examples of contact EC sensors as may be utilized to map a field include those available from Veris Technology.

Non-contact EC sensors work on the principle of electromagnetic induction (EMI) and do not contact the soil surface directly. An instrument generally includes a transmitter and a receiver coil installed at opposite ends of the unit. A sensor in the device measures the resulting electromagnetic field induced at the receiver by a current at the transmitter. The strength of this secondary electromagnetic field is proportional to the soil EC. These devices, which directly measure the voltage drop between a source and a sensor electrode, must be mounted on a non-metallic cart to prevent interference. Non-contact EC sensors such as those available from Geonics Limited or Geophex can be utilized to map the soil texture of a field in one embodiment.

A control system can be loaded with a map (e.g., an EC map) including the soil texture information according to standard practice that can vary depending upon the specifics of the system. For instance, a programmable logic controller (PLC) can be directly loaded with the information or can be in wired or wireless communication with a computer that includes the mapping information. A computer can include processors, input/output devices, memory devices, etc. as are known in the art. A computerized control system can be contained completely on board a harvester or can include communications systems such that a portion of the control system is on board a harvester and a portion of the system is elsewhere, e.g., in a tractor and/or at a remote location. The control system can include communications systems and processing software as is known in the art so as to be in communication with a GPS that can provide information to the control system concerning location of the harvester. The harvester location information can then be processed in conjunction with the mapping information to adjust the digging blade settings as further described below as the harvester moves across a field.

Alternative to or in addition to soil texture mapping information, a system can utilize on-board sensors located on the harvester and/or tractor to determine soil texture information as the harvester is digging the crop. Soil texture information can be indirectly obtained in one embodiment through utilization of one or more depth gauges that can determine the depth of the digging blade as the harvester moves across a field. As the harvester passes into finer texture (e.g., harder) soil, the digging blade will tend to go to a shallower depth if the blade settings are not modified from those of the coarser texture (e.g., softer) soil. Thus, through determination of the location of the digging blade in relation to the soil surface, an indirect determination of soil texture can be obtained. This information can then be fed to a control system that can adjust the settings for the digging blade as desired.

Figure 2:
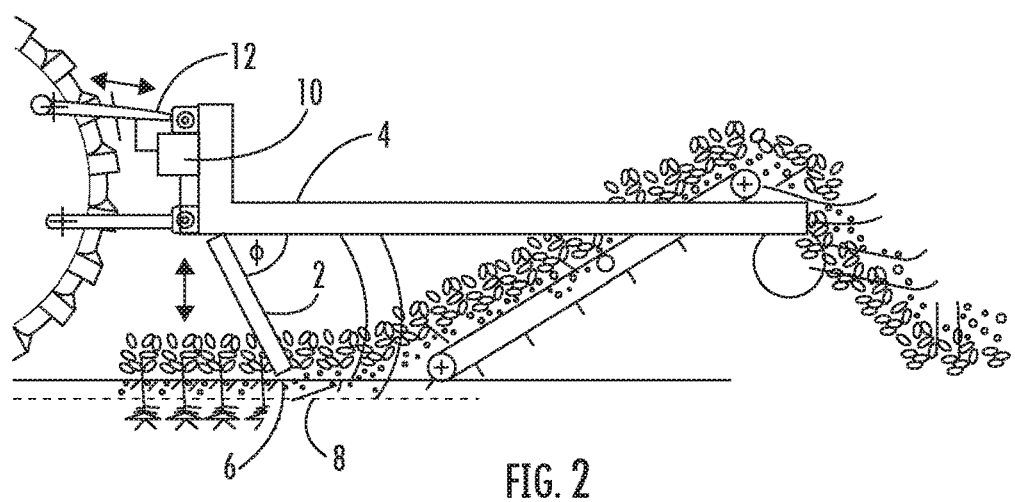
FIG. 2 schematically illustrates a harvester including a depth gauge as described herein.

A depth gauge can utilize optical, sonic, magnetic, electric, mechanical, or any combination of approaches to determine the location of the digging implement during harvesting. One embodiment of a mechanical-based system is illustrated in FIG. 2. In this system, the depth gauge can include an arm 2 attached to the frame 4 of the harvester designed to contact the soil surface 6. The gauge can include tensioning devices, stiffening devices, weighted components, etc. as necessary to maintain contact between the arm 2 and the soil surface 6. As the distance between the frame 4 and the soil surface 6 varies, as indicated by the arrow, the relationship between the frame 4 and the arm 2 will be altered. For instance, the angle φ between the frame 4 and the arm 2 can decrease as the distance between the frame 4 and the soil surface 6 decreases. Of course, any other variation can be determined, such as a variation in the condition of a spring used to attach the arm 2 to the frame 4, variation in distance between the arm and another component of the depth gauge (e.g., a potentiometer), or the like. In any case, as the location of the digger blade 8 with respect to the frame 4 is known, a variation in the distance between the soil surface 6 and the frame 4 as indicated by the depth gauge arm 2 can indicate a variation in the location of the digger blade 8 with respect to the soil surface 6. By way of example, upon travel of a harvester into an area of a field with relatively fine textured (e.g., hard) soil, the digger blade can transition to a shallower depth in the ground. This alteration in digger blade depth can be sensed by the depth gauge, as the distance between the soil surface 6 and the frame 4 will increase. The depth gauge can then transmit this information to a control system including, e.g., a PLC 10 that can alter the settings for the digger blade in order that the blade is directed deeper into the ground.

Of course, a depth gauge can be of any suitable design and is not limited to a mechanical-based device as indicated in FIG. 2. By way of example, a depth gauge can include a target on a digger blade and a transmitter/receiver on a harvester frame. The transmitter/receiver can utilize a signal (e.g., sonic, magnetic, etc.) that can be reflected from the digger blade and upon reception can be processed to determine the distance between the frame and the blade. Additionally, a harvester may utilize more than one depth gauge across its width to indicate blade depth.

A sensor for determining the relative location of a digging implement during harvesting is not limited to a depth gauge. For example, a pressure sensor that determines the draft force against the blade that can be located, e.g., at or near the blade itself or on a linkage between the harvester and a tractor, can be utilized to sense a variation in soil texture during a harvest and thus can be utilized as input to a control system for adjusting the digger blade settings. Moreover, combinations of sensors for determining soil texture can be utilized, for instance, one or more depth gauges in conjunction with one or more sensors for determination of drafting force as the harvester passes through the field.

In one embodiment, one or more depth gauges can be utilized in conjunction with one or more proximity sensors that can determine the distance between a component of the harvester (e.g., a frame, a tongue, etc.) and the ground surface. By way of example, an ultrasonic based or optical-based proximity sensor can be utilized. Proximity or distance measuring devices have been used for some time and are generally known in the art. In ultrasonic distance measuring, ultrasonic signals are emitted from a transducer and the reflected echoes or return signals from objects in the path (e.g., the ground surface) of the ultrasonic pulse are detected after a time interval by the transducer. The elapsed time between the transmission of the pulse and the receiving of a return pulse reflected off of an object (i.e. an echo) can then be used to calculate the distance to the objects causing each reflected return. An optical sensor can generally function in a similar fashion as an ultrasonic sensor by sending out a signal (e.g., an infrared signal), and detecting an echo of the emission.

A proximity sensor can include a signal emitter, e.g., an ultrasonic transducer, operable to transmit and receive a signal, connected to a pulse generator that generates the signal from a source voltage supplied from an electrical system. The system also includes a controller configured to control various aspects of the operation of the sensor. For instance, the controller can be a microprocessor or CPU type device able to execute programmed instructions and that can incorporate internal memory for data storage or can be connected to an external memory device for data storage. The controller can be connected to an input/output unit on the tractor. The connections between the various components may be by wired or wireless.

An optical sensor can utilize signals in the visible, IR, or UV range to generate information indicative of a distance from the emitter to the ground surface. The signals can be incoherent or coherent light (e.g., laser). Light emitted from the optical sensor for reflection off of the ground surface can optionally be modulated so that reflected light from the optical sensor can be discriminated from reflected ambient sunlight.

Of course, the disclosed systems are not limited to optical or ultrasonic proximity sensors and any suitable distance sensor as may be utilized to remotely determine a distance between the ground surface and the harvester is encompassed herein.

Additional input data to the system can include information provided by the operator or otherwise preset in a system. For instance, an operator can input to a control system information with regard to a desired blade depth. By way of example, a predetermined blade depth parameter (for example, a range of from about 3 inches to about 3.5 inches) can be input to a system by the operator or another prior to or during use. During use, this range value can limit variation in the depth of the digging implement.

In conjunction with one or more inputs that provide information with regard to soil texture of a field (e.g., one or more depth gauges, soil EC information, etc.), a control system can include a controller that can be in communication with one or more components of a harvester to adjust the settings for the digging implement(s). By way of example and with reference to FIG. 2, a control system can include a controller 10 in communication with a depth gauge. Upon receipt of a signal from the depth gauge via, e.g., a potentiometer (not shown in FIG. 2) in communication with the arm 2, the controller 10 (e.g., a PLC) can send a signal to a linkage 12 that can extend or retract the linkage 12 as illustrated by the directional arrow. By extending or retracting the linkage, the angle between the soil surface 6 and the digging blade 8 can be altered, cause the digging blade to dig deeper into the soil or, alternatively, to cut a shallower path through the soil. The linkage 12 may be also be directly and permanently mounted to a harvester, mounted between a tractor and accessory hitch (e.g., Quick-Hitch), or as an attachment between a tractor and a harvester as shown in FIG. 2.

In the illustrated embodiment, the linkage utilized to alter the depth of the digging blade is the top linkage of a three point hitch, as is commonly utilized for attachment between a harvester and a tractor. For example, the top link can include an extendible hydraulic cylinder in communication with a controller that can be extended or retracted to alter the angle of the digging blade in relation to the soil surface. Of course, the lower control arms of a hitch can alternatively be utilized.

The depth of the digging blade can alternatively be controlled from a point on the harvester frame or at the blade itself, as desired. For instance, a digging blade can be attached to a harvester frame by use of an adjustable linkage, and this linkage can be utilized to adjust the depth of the digging blade through alteration in the blade angle with respect to the soil surface.

In addition to a soil information input source and a controller to adjust digger settings, a control system can include communication modules, control overrides, manual data entry ports, data output devices, and so forth as are generally known in the art. For instance, a control system can include or be in wired or wireless communication with a graphic user interface located within a tractor for use with a harvester in order that an operator can follow and optionally override the automated digging blade control system.

The present disclosure may be better understood with reference to the following examples.

Example 1

A field of approximately 2.7 hectares (ha) (6.7 acres(ac)) with a substantial amount of soil texture variability, from 88 to 98% sand content, 0 to 8.5% silt content and 0 to 6% clay content was used to harvest peanuts. The plots were 12 meters (m) (40 feet (ft.)) long with row spacing at 97 centimeters (cm) (38 inches (in.)). Plots were dug with a KMC two-row, three-point hitch mounted digger/shaker/inverter (Kelley Manufacturing Co., Tifton, Ga.) and a John Deere 7330 equipped with Trimble RTK AutoPilot™ (Trimble Navigation Limited, Sunnyvale, Calif.) following the same path from planting to minimize digging losses from row center deviation. Tillage was conventional. The digger blade was mounted so that the bevel was down. Care was taken to ensure that blades were not dull, conveyor speed was properly matched to ground speed, vines were not wrapping around shanks, and that blade angle and depth were set properly.

Soil electrical conductivity (EC) mapping using a Veris 3100 (Veris Technologies Inc., Salina, Kans.) was used to spatially delineate three soil texture zones: low EC, medium EC, and high EC. The three zones were defined using an EC contour map constructed in Farm Works Software (Trimble Navigation Limited, Sunnyvale, Calif.). To verify the validity of the use of EC data for delineation of soil texture zones within the digging depth of influence, soil samples were collected from the top 10 cm (4 in.) at the time of digging. Hydrometer tests were conducted on the samples to quantify the relative fractions of sand, silt, and clay.

Based on observation of the windrow at the time of digging, the harvester was set up for the proper digging blade angle within each of the three soil texture zones, providing a low EC setting, a medium EC setting, and a high EC setting. Once the proper blade angle was determined for each of the three soil texture zones, all three of these blade angle settings were applied as digging treatments across each of the soil texture zones, giving nine treatments. An additional "too shallow" setting was applied in the low EC zone and a "too deep" setting was applied in the High EC zone, giving a total of 11 treatments across the 3 soil texture zones (see Table 1, below). The blade angle was set by extension of the top link of the three point hitch on the harvester. In the table, the top link cylinder extension is provided as a percentage of full extension length. Six replicates were provided for each treatment and comparisons across treatments within each soil texture zone were performed using one-way ANOVA and Fisher's LSD tests ($\alpha=0.05$). Analysis of variance was not performed across data from different soil texture zones.

TABLE 1

| Digger Setting | Low EC Zone | | | Medium EC Zone | | | High EC Zone | | |
|---|---|---|---|---|---|---|---|---|---|
| | % Ext. | | SD | % Ext. | | SD | % Ext. | | SD |
| Too Shallow | 79.8 | a | 0.56 | — | | — | — | | — |
| Low EC | 75.5 | b | 0.40 | 75.2 | a | 0.14 | 75.1 | a | 0.52 |
| Medium EC | 69.9 | c | 0.50 | 70.1 | b | 0.41 | 70.6 | b | 0.34 |
| High EC | 55.8 | d | 0.11 | 56.0 | c | 0.26 | 56.1 | c | 0.19 |
| Too Deep | — | | — | — | | — | 46.6 | d | 1.98 |

Figure 3A:
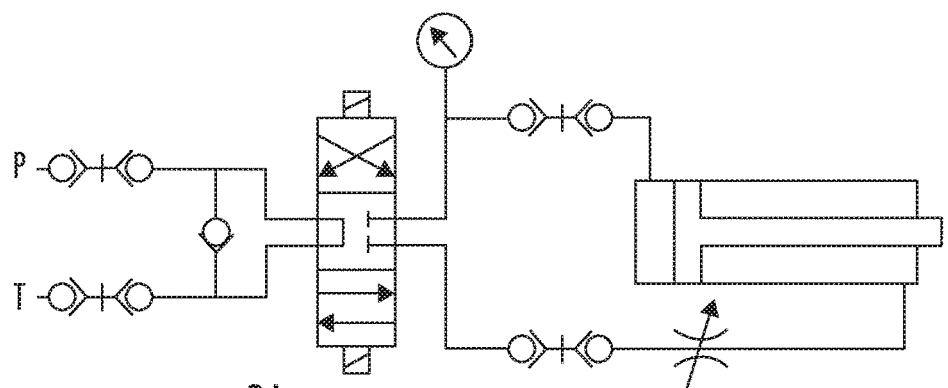
FIG. 3 illustrates a schematic used for hydraulic top link control of a digger blade on a peanut harvester (FIG. 3A) and the physical mounting of a hydraulic top link, a linear potentiometer, and valve block of a peanut harvester (FIG. 3B).
Figure 3B:
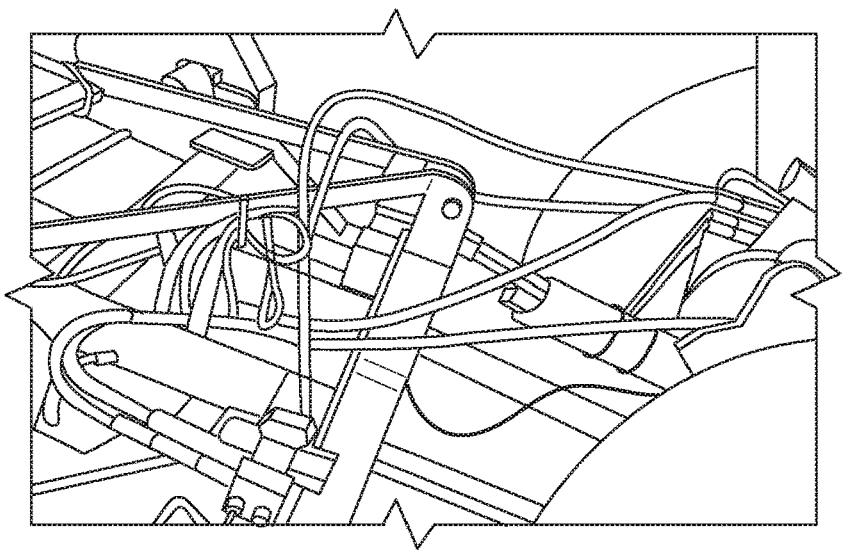

A model 9-5152 8×20×4 cm (3.0×8.0×1.5 in.) double acting hydraulic top link (Surplus Center, Lincoln, Neb.) was provided for control of the blade angle, extension providing shallower depths and retraction providing deeper depths. A three-position, 4-way DC solenoid valve (D03S-2C-12D-35, Hyvair Corp., Magnolia, Tex.) was used to actuate the hydraulic top link (FIG. 3A, FIG. 3B). Solenoid switching was provided through digital outputs of a model 1018 interface kit (Phidgets Inc., Calgary, Alberta, Canada) and model 3051 dual relay board (Phidgets Inc., Calgary, Alberta, Canada). The cylinder was mounted so that the rod was facing the implement and a series TDH30 pressure transducer (Transducers Direct, Cincinnati, Ohio) was installed in line with the blind or cap end, providing an indication of reactant force on the top link during digging. To provide indication of percent extension of the top link, a model 3582 linear potentiometer (Phidgets Inc., Calgary, Alberta, Canada) was attached to the cylinder.

Data from the soil texture analysis demonstrated correlations between soil texture zones, as defined by EC mapping, and both sand and silt content in the top 10 cm (4 in). This supports the use of soil EC mapping for definition of soil texture, and therefore digging management zones. Sand and silt contents were significantly different across each of the three EC-defined soil texture zones, with decreasing sand content and increasing silt content through the low EC zone, medium EC zone, and high EC zones, successively. Clay content was only significantly different between the medium EC and high EC zones, being higher in the high EC zone as shown in Table 2 below.

TABLE 2

| EC Zone | Sand Content % | | SD | Silt Content % | | SD | Clay Content % | | SD |
|---|---|---|---|---|---|---|---|---|---|
| Low EC | 51 | a | 17 | 31 | a | 16 | 18 | a, b | 11 |
| Medium EC | 36 | b | 14 | 47 | b | 12 | 17 | a | 10 |
| High EC | 17 | c | 14 | 58 | c | 15 | 25 | b | 13 |

The reactant force imparted on the top link during digging, as measured by the hydraulic pressure transducer, was directly proportional to digging blade angle and significantly different across all treatments within each soil texture zone (see Table 3, below). Top link hydraulic pressure data were not available for the low EC texture digging treatments due to a sensor malfunction during testing. Data indicated that top link pressure may be a useful tool in feedback based control of the digger angle.

TABLE 3

| Digger Setting | Medium EC Zone P, psi | | SD | High EC Zone P, psi | | SD |
|---|---|---|---|---|---|---|
| Low EC | 241 | a | 86 | 259 | a | 155 |
| Medium EC | 450 | b | 155 | 471 | b | 94 |
| High EC | 730 | c | 128 | 666 | c | 54 |
| Too Deep | — | | — | 991 | d | 36 |

The relationships demonstrated between soil texture and soil EC indicated that EC mapping is acceptable for delineation of soil texture zones for typical peanut digging depths. Electrical control of a hydraulic top link proved to be an effective and practical method of on-the-go digging angle adjustment. The technology allowed the operator to manually set or prescribe the proper top link setting for each of his EC-defined soil texture zones. The top link setting for each texture zone was stored in the control computer as a linear potentiometer analog input. Using GPS position, the software could then be used to automatically adjust to the appropriate top link prescription, or linear potentiometer analog input, as a function of position and therefore current soil texture zone. The system can provide automated control of digging angle while still allowing the operator the ability to adjust top link extension prescriptions as necessary.

Example 2

The planting/harvesting methodology and materials, and soil electrical conductive mapping were as described in Example 1. The field used was approximately 6.9 ha (17 ac) with all soils being classified as sand and loamy sand. The plots in this example were 29.3 m (96 ft) long with row spacing at 97 cm (38 in.). The average sand, silt, and clay contents, respectively, were: 96.1%, 1.7%, and 2.2% in the low EC zone; 92.2%, 5.5%, and 2.3% in the medium EC zone; and 87.6%, 8.3%, and 4.1% in the high EC zone.

Extension-lock treatments and depth-lock treatments as described below were carried out. Replicates of each treatment were provided and spatially arranged as plots in completely randomized designs within each soil texture zone. Travel direction was easterly and the same for all plots. Plots with heavy weed pressure or planting skips were excluded from the study. Comparisons across treatments within each soil texture zone were performed using one-way ANOVA and Fisher's LSD tests ($\alpha=0.05$). Analysis of variance was not performed across data from different soil texture zones, since soil texture was spatially organized and could not be randomized. In addition to the plot treatments, two strip treatments were provided using the depth-lock proper setting and the extension-lock medium EC setting. Strips covered the entire length of the field and traversed all three EC zones. Two replicates of each strip treatment were provided, giving four adjacent strips. The strip treatments are further described below.

The harvester was equipped with a solenoid-controlled hydraulic top link as described above and a data acquisition system collecting data at 10 Hz through a model 1018 interface kit (Phidgets Inc., Calgary, Alberta, Canada). Data acquisition software was developed in Visual Basic 2010 Express (Microsoft Corp., Redmond, Wash.). The software developed included control functions for the hydraulic top link.

A model WFC-400 hydraulic flow control valve (Prince Manufacturing Corporation, North Sioux City, S.D.) was added to the blind end of the cylinder described in Example 1 to control the extension rate. The use of the tractor's hydraulic flow control was used to control the retraction rate of the cylinder. The flow control valves were set so that cylinder extension and cylinder retraction rates were equal at 0.36 in sec$^{-1}$.

Extension Lock Treatments

Based on visual observation of the windrow at the time of digging, the harvester was set up for the proper digging blade angle within each of the three soil texture zones, providing cylinder extension lengths for a proper low EC setting, a proper medium EC setting, and a proper high EC setting. Once the proper blade angle was determined for each of the three soil texture zones, all three of these top link extension lengths were applied as extension-lock digging treatments across each of the three soil texture zones, providing nine treatments. The software was programmed so that the cylinder extension would automatically adjust as necessary to stay within ±1% of the prescribed cylinder extension for any given treatment, percent provided as percent of stroke length.

Depth-Lock Treatments

A blade depth gauge (FIG. 4A) was fabricated from an 81 cm (32 in.) length of 2.5 cm (1 in.) diameter steel round stock and approximately 1 ft$^2$ of 16 gauge steel plate, which was provided to stiffen the assembly, provide down force, and keep the mechanical linkage out of the peanut vines. The gauge trailed from the frame to the left side of the harvester, roughly in-line with the rear of the blade so it was allowed to freely pivot as it trailed along the ground surface. A mechanical linkage was fabricated to connect the depth gauge to a model AT333680 rotary potentiometer (Deere & Company, Moline, Ill.) mounted to the underside of the digger frame. As the depth gauge moved up and down going through the field it moved the rotary potentiometer shaft. Indicated blade location relative to the depth gauge invert elevation was calibrated and indicated by rotary position of the potentiometer.

Software was programmed so that the top link (FIG. 4B) would automatically adjust as necessary to stay within ±0.091 cm (±0.036 in.) of the prescribed blade location relative to the ground surface for any given treatment. Spring tension force using a C-277 Century Spring (Century Spring Corp., Los Angeles, Calif.) was applied to assist the depth gauge in maintaining contact with the ground through thick peanut vines and rough field conditions. The spring was positioned to limit excessive down-force to reduce the tendency for the depth gauge would to push downwards through bare, loose soil.

The indicated blade location was calibrated using a linear regression model as a function of rotary potentiometer position (FIG. 5). Based on visual observation of the windrows across soil textures, a Depth-Lock Proper setting was prescribed at a blade elevation of 0.05 cm (0.02 in.) and an additional two treatments were applied as Depth-Lock Shallow at a blade elevation of 0.58 cm (0.23 in.) above the Depth-Lock Proper setting, and Depth-Lock Deep at blade elevation of 0.58 cm (0.23 in.) below the Depth-Lock Proper setting.

Strip-Trial Evaluation of Depth-Lock and Extension-Lock Control Logic

Strip trials were conducted with the depth-lock proper setting and the extension-lock medium EC setting to assess the effects on blade location when crossing soil EC zones. Two replications were provided for each treatment, with strips arranged across the 378 m (1,240 ft.) length of the field; all replications crossed all three soil EC zones. The direction of travel was in both directions across the field to simulate the typical manner performed by a grower. The replications of each treatment were conducted in both directions of travel, easterly and westerly. As in the plot treatment, the digger blade location relative to the ground surface was indicated by the calibrated depth gauge output. Assessment of the relationship between blade location and soil EC was provided by contouring the soil EC in Farm Works Software (Trimble Navigation Limited, Sunnyvale, Calif.). Spatial position was provided by a model 1040 GPS (Phidgets Inc., Calgary, Alberta, Canada), which allowed the blade locations to be averaged with each soil EC contour. The average soil EC values were then compared to the average digging blade locations relative to the ground surface (i.e., blade elevation).

Figure 6A:
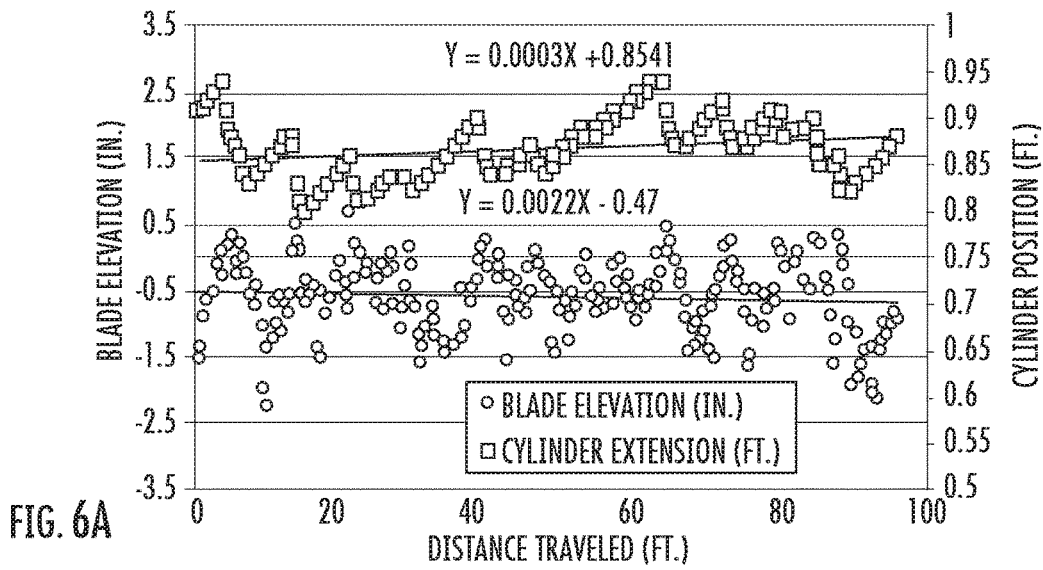
FIG. 6 presents blade elevation across a field under a depth lock control treatment (FIG. 6A) and an extension lock control treatment (FIG. 6B).
Figure 6B:
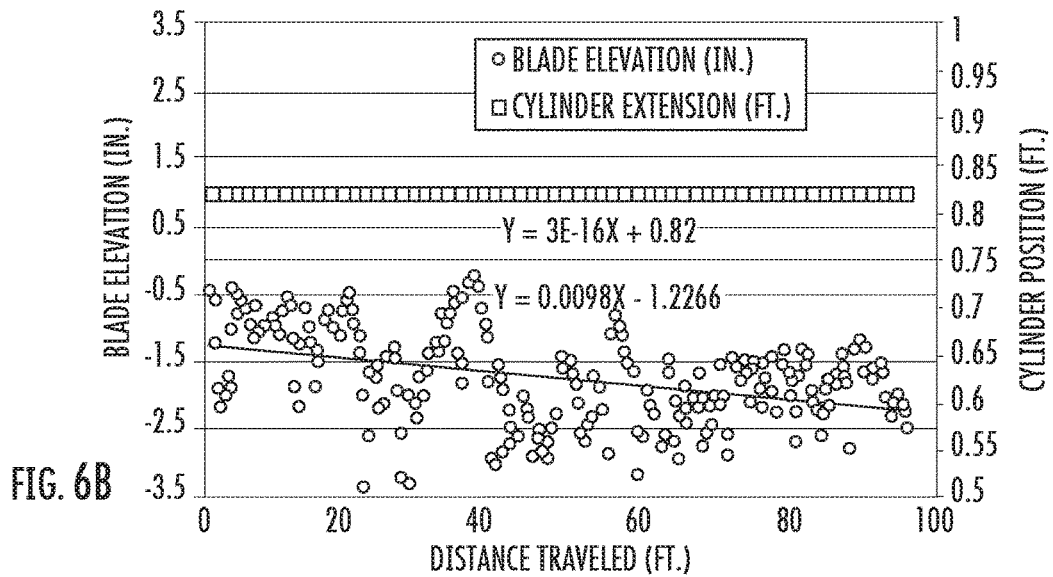
Figure 7:
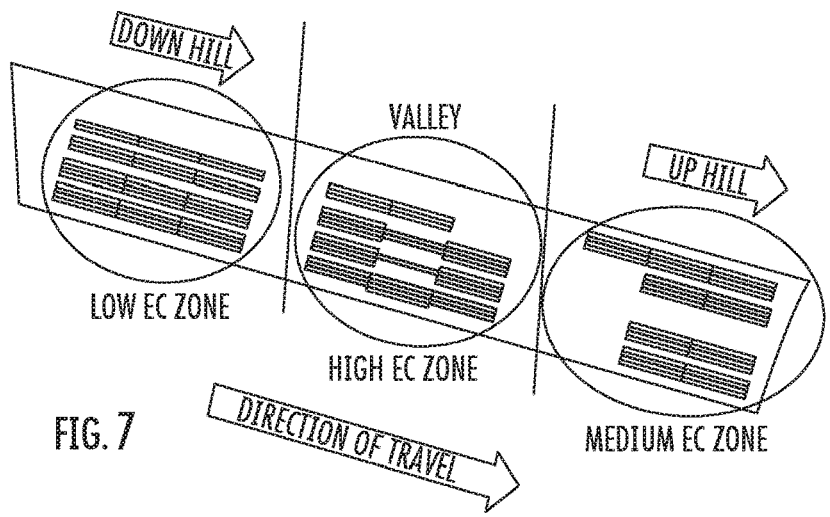
FIG. 7 illustrates the general elevation changes across a field utilized in the examples section, below.

FIG. 6 shows blade elevation and top link position as a function of distance travelled through two of the plots in the study. The data in FIG. 6A and FIG. 6B are representative of trends found within many depth-lock control and extension-lock control logic treatments, respectively. The location of the plots shown was in the high EC zone in a shallow valley within the field, which is not uncommon in peanut fields (FIG. 7).

As shown in FIG. 6A, the blade elevation trend line demonstrated a relatively flat appearance with a change in blade elevation of 0.017 cm m$^{-1}$ (0.002 in. ft$^{-1}$) traveled indicating that the blade held a fairly consistent depth across the field. The digging elevation in FIG. 6A tended to get a little deeper towards the end of the plot tested. This is likely due to the slow hydraulic response time demonstrated for actuation of the hydraulic top link for extension relative to that for retraction. The hydraulic flow rate was measured and set under no-load conditions, and when draft from the digger assisted retraction of the cylinder, the target depth was exceeded, requiring a greater length of cylinder extension time to compensate. This phenomenon is demonstrated in the cylinder extension data of FIG. 6A by the steep downward slopes on retraction and the shallow upward slopes on extension. In short, correcting to a shallower depth required more time than did correcting to a deeper depth. This issue could likely be addressed through incorporation of pressure compensated flow controls.

When comparing blade elevations of the depth-lock treatment (FIG. 6A) to those of the extension-lock treatment (FIG. 6B), the depth-lock treatment maintained a more constant depth across the plot. In the extension-lock plot (FIG. 6B), the top link extension was set for the extension-lock high EC setting, or the proper cylinder extension for the high soil EC zone. The top link extension (FIG. 6B), showed a flat trend line confirming that the top link successfully maintained the prescribed position across the plot. The indicated blade elevation (FIG. 6B), showed a relatively dramatic decrease in digging elevation across the 29.3 m (96 ft.) plot, with a change in depth of 0.083 cm m$^{-1}$ (0.010 in. ft$^{-1}$), or about 5× that for the depth-lock treatment as shown in FIG. 6A. This increase of digging depth across the plot could have been due to the change in terrain within the field or likely local soil texture and moisture differences across the plot. The extent of digging elevation change within a plot tended to vary depending on the degree variability change in soil EC and terrain changes within the plot which would cause the tractor or implement to pitch up or down.

In the plot study, all of the depth-lock control logic treatments maintained a maximum average blade location difference of 0.48 cm (0.26 in.) across all soil EC zones; as seen in Table 4 below. The extension-lock control logic treatments across all soil EC zones produced a maximum average digging elevation difference of 1.07 cm (0.42 in.). The values indicate blade elevation relative to the ground surface, with negative values representing indicated blade depth below ground. The results indicate that the depth-lock control logic was able to maintain a more consistent digging elevation when crossing soil EC zones than the extension-lock method tested, which in essence represents a conventional, or fixed top link position. Previous studies have demonstrated that there is an optimum digging depth for each texture, both above and below which would increase digging losses. If pods grow at similar depths across soil textures, then the data in the table implies that the depth-lock control logic method can be an acceptable method of reducing yield losses across a field, especially in fields that may not be completely flat or have different terrain features affecting digging elevation as a function of the tractor or implement position.

TABLE 4

| Treatments | Low EC Zone | | Medium EC Zone | | High EC Zone | |
|---|---|---|---|---|---|---|
| | Avg. Depth (in) | SD | Avg. Depth (in) | SD | Avg. Depth (in) | SD |
| DepthLock-Shallow | −0.50 a | 0.13 | −0.46 a | 0.08 | −0.41 a | 0.20 |
| DepthLock-Proper | −0.74 a | 0.36 | −0.68 b | 0.09 | −0.61 ab | 0.10 |
| DepthLock-Deep | −0.72 a | 0.15 | −0.98 c | 0.08 | −0.78 bc | 0.09 |
| Ext. Lock-LowEC | −0.59 a | 0.38 | −0.64 ab | 0.18 | −0.55 ab | 0.19 |
| Ext. Lock-MediumEC | −1.31 b | 0.46 | −1.01 c | 0.15 | −0.89 c | 0.19 |
| Ext. Lock-HighEC | −1.61 b | 0.08 | −1.57 e | 0.09 | −1.33 d | 0.36 |

Figure 8:
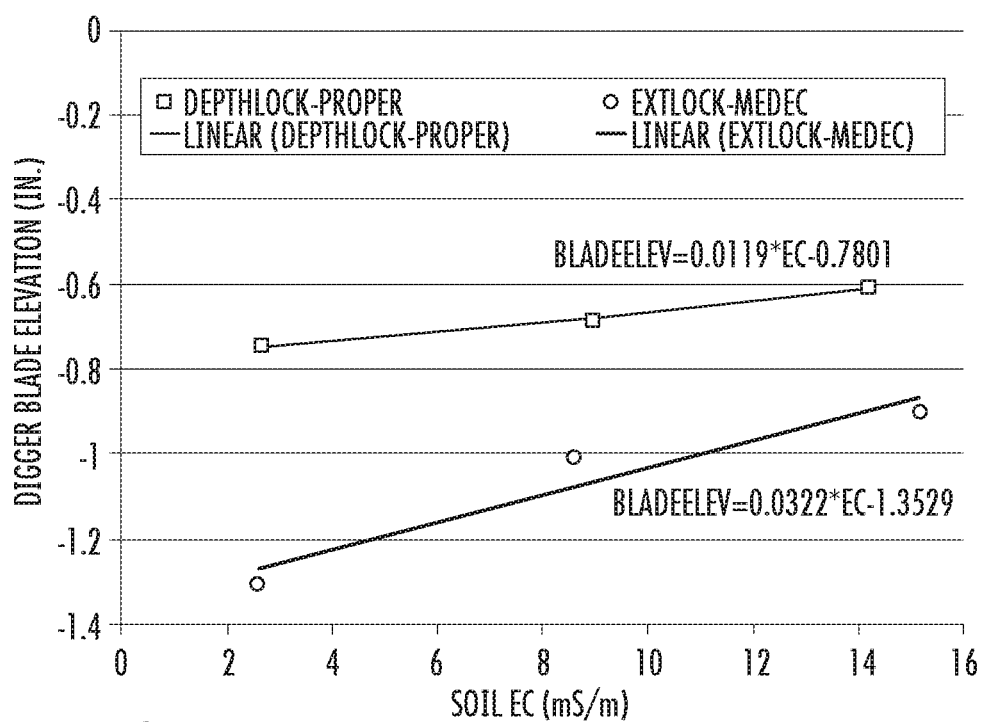
FIG. 8 graphically illustrates blade location as a function of soil electrical conductivity (EC) in the trials comparing a depth lock control treatment with an extension lock control treatment.

The plot trial data in FIG. 8 shows a comparison of blade elevation as a function of EC for the depth-lock proper treatment and the extension-lock medium EC treatment. While both treatments demonstrated that the digging depth got shallower as finer texture soils (higher ECs) were encountered, the results show that the depth-lock proper control method was able to maintain a more consistent digging elevation across all soil EC zones. The slopes from the linear regressions suggest that the depth-lock control logic was almost 3 times as effective in maintaining depth as a function of EC, as compared to the extension-lock control logic. For the extension-lock medium EC treatments the digger blade was being forced upwards in higher soil ECs. Without the implement being able to compensate for the depth change this could lead to additional mechanical losses within the field.

Figure 9:
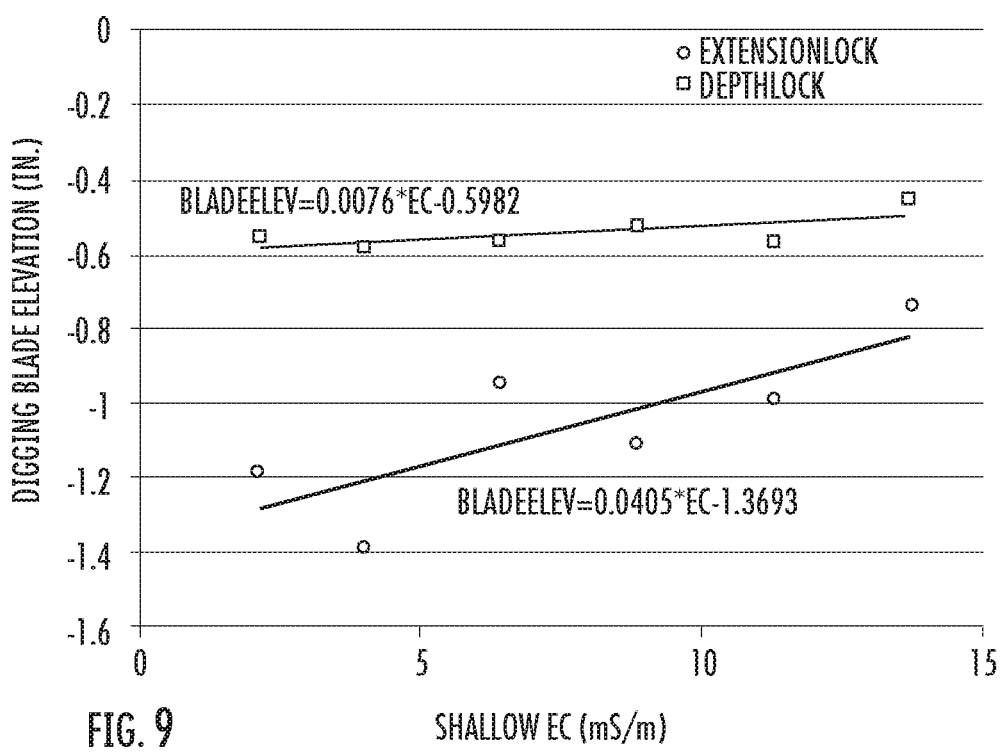
FIG. 9 graphically illustrates blade location as a function of soil EC for the depth-lock proper and the extension-lock medium EC settings in trials described further herein.

FIG. 9 shows the average digging blade location as a function of soil EC for both the extension-lock medium EC setting and the depth-lock proper method over the 378 m (1,240 ft.) strip trial. The change in digging blade elevation for extension-lock medium EC setting across all soil EC zones tested, as indicated by regression model, can be approximated as 1.2 cm (0.47 in.) from blade locations of −3.25 cm (−1.28 in.) to −2.06 cm (−0.81 in.). The change in digging blade elevation for depth-lock proper setting across all soil EC zones tested, as approximated by the regression model, was 0.23 cm (0.09 in.) from blade elevations of −1.47 cm (−0.58 in.) to −1.24 cm (−0.49 in.). This data further demonstrates that the depth-lock control logic better maintained a consistent digging blade elevation when crossing different soil EC zones within the field tested, as compared to the extension-lock control logic.

Digger data analysis indicated that the depth-lock control logic better maintained a constant blade depth than the extension-lock control logic with the added benefit of continuous variable top link extension capabilities. The depth-lock control logic treatments demonstrated a lower overall change in blade elevation as a function of soil EC when compared to the extension-lock control logic treatments in both plot and strip trials, meaning the depth-lock control logic method did better overall during this study of maintaining a constant digging depth. The depth-lock control logic accomplished this while going through varying peanut canopy thicknesses, up and down hill situations and across varying soil textures, justifying that the depth-lock control logic is a feasible means of peanut digging blade depth control and could be a better alternative to the extension-lock control logic, which is representative of a conventional fixed top link.

Example 3

Digger related yield losses were compared for four different methods of digging depth control: conventional, fixed top link setting for the heaviest soil in a field; map-based extension-lock top link adjustment; depth-lock control based on feedback from a depth gauge; and 3-point hitch control arm adjustment.

The field, planting/harvesting methodology and materials, and soil electrical conductive mapping were as described in Example 2.

A total of 20 digging treatments were applied as described below: nine extension-lock treatments, nine depth-lock treatments, and two control-arm treatments. Six replicates of each treatment were provided and arranged as plots in completely randomized designs within each soil texture zone. Plots with heavy weed pressure or planting skips were excluded from the study. Comparisons across treatments within each soil texture zone were performed using one-way ANOVA and Fisher's LSD tests ($\alpha=0.05$). Analysis of variance was not performed across data from different soil texture zones.

The digger was equipped with a solenoid-controlled hydraulic top link, a linear potentiometer indicating extension length of the hydraulic top link, a rotary potentiometer indicating position of a digging blade depth gauge, and a data acquisition system as described above.

The harvester was equipped with the solenoid-controlled hydraulic top link as described above and a data acquisition system collecting data at 10 Hz through a model 1018 interface kit (Phidgets Inc., Calgary, Alberta, Canada). Data acquisition software was developed in Visual Basic 2010 Express (Microsoft Corp., Redmond, Wash.). The software developed included control functions for the hydraulic top link.

A model WFC-400 hydraulic flow control valve (Prince Manufacturing Corporation, North Sioux City, S.D.) was added to the blind end of the cylinder to control the extension rate. The use of the tractor's hydraulic flow control was used to control the retraction rate of the cylinder. The flow control valves were set so that cylinder extension and cylinder retraction rates were equal at 0.36 in sec-1.

Extension lock treatments and depth lock treatments were carried out as described above.

Control-Arm Treatments

Control-arm treatments were included to evaluate digging losses for a scenario where a top link is set at the shortest length for the finest soil texture (highest EC) in a field the 3-point hitch lower control arms are lifted or lowered as necessary as soil variation is encountered. This type of control method would not require a hydraulic top link, although automated control would require the capability of accessing the vehicle controls. Control-arm treatments were only applied in the low and medium EC zones. In each of these two zones, the depth limit control knob for the 3-point hitch was adjusted (reduced) incrementally to prescribe a proper depth limit for that EC zone, coupled with the proper top link extension length for the high EC zone. As in the other types of treatments, proper depth limit was determined by visual observation of the windrow. Reduction of the depth limit on the 3-point hitch caused the harvester to dig less aggressively in the lighter soil textures. In the low EC zone the control arm was adjusted to provide an average digging depth of −1.9 cm (−0.73 in.), and in the medium EC zone an adjustment provided an average digging depth of −3.4 cm (−1.33 in.).

Digging loss data collection occurred six days after digging. A 1.2 m (4 ft.) long by 2 row sample area was defined at a travel distance of 18.3 m (60 ft.) into each plot to allow sufficient time for the automated controls to stabilize. To distinguish digging losses from combining losses, a 1.8 m (6 ft.) section of windrow above the sample area was gently lifted with a custom built windrow lifter. This allowed individuals to collect above ground digging losses from the defined sample area prior to combining. Once above ground losses were collected a research plot combine was used to harvest peanuts, record yield weight, and collect combine samples from each plot. Prior to excavation, combine discharge and possible combining losses were removed from the test areas using a leaf blower. Once each test area was clear of debris, it was excavated to a depth of approximately 10 cm (4 in.) and the excavated soil was mechanically sieved to collect the below ground losses. Above and below ground digging losses as well as 500 g samples from the combine were oven-dried using ASABE S401.2 conventional oven method (ASABE 2012). Over-mature and diseased pods were dried and weighed separately from the other digging losses, as they were not considered to be mechanical digging losses because of their high propensity to be lost during harvest regardless of digger setup due to weak peg strength.

Recoverable yield losses were defined as the sum of combine yield for the plot and mechanical digging losses for the sample area, excluding over-mature and diseased digging losses. The data in Table 5 below show that only one treatment in one EC zone demonstrated a statistical difference in recoverable yield as compared to that of the other treatments; letters indicating results of Fisher's LSD tests in the following tables were conducted within, and not across soil texture zones. Average recoverable yield across treatments within each soil texture zone as presented in the last row of the table show that the average recoverable yield for the medium EC and high EC zones were 761 and 850 kg ha$^{-1}$ d.b. (679 and 759 lb ac$^{-1}$ d.b.) higher than that in the low EC zone.

TABLE 5

| Treatment | Low EC Zone | | | Medium EC Zone | | | High EC Zone | | |
|---|---|---|---|---|---|---|---|---|---|
| | lb ac$^{-1}$, d.b. | | SD | lb ac$^{-1}$, d.b. | | SD | lb ac$^{-1}$, d.b. | | SD |
| Ext. Lock-LowEC | 3,589 | a | 795 | 4,058 | a | 324 | 4,401 | a | 192 |
| Ext. Lock-MediumEC | 3,872 | a | 712 | 4,225 | a | 456 | 4,270 | a | 249 |
| Ext. Lock-HighEC | 3,061 | ab | 187 | 4,413 | a | 158 | 4,451 | a | 294 |
| DepthLock-Shallow | 3,944 | ab | 924 | 4,245 | a | 226 | 4,308 | a | 293 |
| DepthLock-Proper | 3,643 | ab | 606 | 4,113 | a | 370 | 4,129 | a | 362 |
| DepthLock-Deep | 3,209 | b | 200 | 4,333 | a | 257 | 4,284 | a | 373 |
| ControlArm | 3,517 | ab | 741 | 4,200 | a | 359 | — | — | — |
| Average, All Plots | 3,548 | | 595 | 4,227 | | 307 | 4,307 | | 294 |

The mechanical digging loss results, as seen in the tables below, showed statistical differences between treatments in the low EC zone and implied that all treatments within the medium EC and high EC zones performed the same, statistically. Although treatments cannot be statistically compared across soil EC zones due to the nature of the plot design, mechanical digging losses on lb ac$^{-1}$ and percent bases were consistently lowest within each treatment in the low EC zone.

The data from tables 6 and 7 were summarized by grouping them into depth control methods, where the digging losses for the proper setting for each method within each EC zone were averaged. Such a summary provided a numerical indication of expected full field digging losses for each depth control method. Application of the feedback based depth-lock control method numerically performed the best and is represented by using digging losses from the DepthLock-Proper treatment within each EC zone, giving average digging losses of 262 kg ha$^{-1}$ (234 lb ac$^{-1}$) or 5.7%. The conventional depth control method where an operator set the top link to the proper position for the finest soil texture produced the second lowest mechanical digging losses. In this scenario the Ext. Lock-High EC treatment was used in each EC zone, giving average digging losses of 277 kg ha$^{-1}$ (247 lb ac$^{-1}$) or 5.7% of the recoverable yield. If using the map-based control system, digging losses for the proper Extension-Lock setting in each soil texture zone can be applied, giving average digging losses of 286 kg ha$^{-1}$ (255 lb ac$^{-1}$) or 6.0%. The map-based control system produced the third best mechanical digging losses. Finally, the highest, or worst, mechanical digging losses were exhibited if the 3-point hitch control arm method was applied, use of digging losses from the control arm treatments in the low and medium EC zones with the Ext. Lock-HighEC treatment in the high EC zone give average digging losses of 309 kg ha$^{-1}$ (276 lb ac$^{-1}$) or 6.6%. It should be noted that the differences in digging losses between these four modes of control were not statistically significant, with a total difference between the best and worst mode of only 47 kg ha$^{-1}$ (42 lb ac$^{-1}$), which would equate to $8.40 per acre if considering a peanut value of $400 per ton.

TABLE 6

| Treatment | Low EC Zone | | | Medium EC Zone | | | High EC Zone | | |
|---|---|---|---|---|---|---|---|---|---|
| | Loss lb ac$^{-1}$ d.b. | | SD | Loss lb ac$^{-1}$ d.b. | | SD | Loss lb ac$^{-1}$ d.b. | | SD |
| Ext. Lock-LowEC | 78.5 | b | 50.7 | 366 | a | 102 | 305 | a | 110 |
| Ext. Lock-MediumEC | 129 | ab | 116 | 395 | a | 79.0 | 330 | a | 120 |
| Ext. Lock-HighEC | 52.4 | b | 24.6 | 396 | a | 163 | 291 | a | 130 |
| DepthLock-Shallow | 271 | a | 312 | 345 | a | 121 | 272 | a | 64.7 |
| DepthLock-Proper | 98.2 | b | 57.0 | 298 | a | 120 | 306 | a | 223 |
| DepthLock-Deep | 60.7 | b | 43.1 | 416 | a | 160 | 433 | a | 197 |
| ControlArm | 85.1 | b | 63.6 | 453 | a | 180 | — | — | — |

TABLE 7

| Treatments | Low EC Zone | | | Medium EC Zone | | | High EC Zone | | |
|---|---|---|---|---|---|---|---|---|---|
| | Avg. Elev. (in.) | | SD | Avg. Elev. (in.) | | SD | Avg. Elev. (in.) | | SD |
| Ext. Lock-LowEC | −0.49 | a | 0.38 | −0.64 | ab | 0.18 | −0.55 | ab | 0.19 |
| Ext. Lock-MediumEC | −1.31 | b | 0.46 | −1.01 | c | 0.15 | −0.89 | c | 0.19 |
| Ext. Lock-HighEC | −1.61 | b | 0.08 | −1.57 | e | 0.09 | −1.33 | d | 0.36 |
| DepthLock-Shallow | −0.50 | a | 0.13 | −0.46 | a | 0.08 | −0.41 | a | 0.20 |
| DepthLock-Proper | −0.74 | a | 0.36 | −0.68 | b | 0.09 | −0.70 | ab | 0.10 |
| DepthLock-Deep | −0.72 | a | 0.15 | −0.98 | c | 0.08 | −0.78 | bc | 0.09 |
| ControlArm | −0.73 | a | 0.12 | −1.33 | d | 0.38 | — | — | — |

Average indicated blade elevation, as seen in Table 8 below, demonstrated that blade elevation for Extension-Lock treatments within EC zones consistently decreased with increasing digging angle or aggressiveness.

TABLE 8

| Treatment | Low EC Zone | | | Medium EC Zone | | | High EC Zone | | |
|---|---|---|---|---|---|---|---|---|---|
| | Loss % Rec. | | SD | Loss % Rec. | | SD | Loss % Rec. | | SD |
| Ext. Lock-LowEC | 2.07 | b | 1.19 | 9.09 | a | 2.62 | 6.86 | a | 2.27 |
| Ext. Lock-MediumEC | 3.00 | ab | 2.55 | 9.35 | a | 1.44 | 7.84 | a | 3.14 |
| Ext. Lock-HighEC | 1.70 | b | 0.76 | 9.00 | a | 3.80 | 6.45 | a | 2.67 |
| DepthLock-Shallow | 5.78 | a | 6.00 | 8.18 | a | 3.08 | 6.35 | a | 1.66 |
| DepthLock-Proper | 2.57 | b | 1.22 | 7.22 | a | 2.88 | 7.23 | a | 5.04 |

TABLE 8-continued

| Treatment | Low EC Zone | | Medium EC Zone | | High EC Zone | | |
|---|---|---|---|---|---|---|---|
| | Loss % Rec. | SD | Loss % Rec. | SD | Loss % Rec. | | SD |
| DepthLock-Deep | 1.91 b | 1.39 | 9.62 a | 3.68 | 10.36 | a | 5.07 |
| ControlArm | 2.22 b | 1.47 | 11.1 a | 5.01 | — | | — |

Over-mature and diseased pods for each plot were grouped together into one category with no differentiation made between the two. The data from Table 9 below suggests a relatively low maturity rate in the low the low EC zone and relatively high over-maturity and/or diseased pod rate in the medium EC and high EC zones by the extreme differences in over-mature and disease pod digging losses. The delay in maturity for the low EC zone could have assisted in the plant being able to hold onto the pods during the inversion process allowing for a 433 to 635 kg ha$^{-1}$ d.b. (387 to 567 lb ac$^{-1}$ d.b.) reduction in over-mature and diseased pod digging losses as compared to the medium EC and high EC zones. While recoverable yield was also lowest in the low EC zone, over-mature and diseased digging losses there were proportionately much less than the recoverable yield as compared to the other zones. This finding demonstrates a need for sampling for maturity and therefore time of digging to be determined by a composite sample across soil EC zones versus the use of undirected random sampling within a given field.

TABLE 9

| Treatment | Low EC Zone | | | Medium EC Zone | | | High EC Zone | | |
|---|---|---|---|---|---|---|---|---|---|
| | OMD lb ac$^{-1}$ d.b. | | SD | OMD lb ac$^{-1}$ d.b. | | SD | OMD lb ac$^{-1}$ d.b. | | SD |
| Ext. Lock-LowEC | 60.3 | ab | 33.5 | 793 | a | 293 | 501 | ab | 197 |
| Ext. Lock-MediumEC | 128 | ab | 83.8 | 716 | a | 221 | 581 | ab | 414 |
| Ext. Lock-HighEC | 48.5 | b | 35.9 | 687 | a | 277 | 331 | b | 195 |
| DepthLock-Shallow | 167 | a | 151 | 574 | a | 130 | 480 | ab | 89.5 |
| DepthLock-Proper | 148 | ab | 146 | 529 | a | 228 | 378 | ab | 214 |
| DepthLock-Deep | 59.8 | ab | 46.1 | 525 | a | 171 | 637 | a | 282 |
| ControlArm | 73.1 | ab | 56.0 | 831 | a | 448 | — | | — |
| Average, All Plots | 97.8 | | 78.9 | 665 | | 253 | 485 | | 232 |

These and other modifications and variations of the present invention may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims.

What is claimed is:

1. A method for harvesting an underground crop comprising:
providing information regarding changes in soil texture and/or friability across an area to be harvested to an input device, the input device being in communication with a control system, the control system being configured to process the information and automatically adjust an underground crop digging implement of a harvester as the harvester passes across the area in response to the information.

2. The method of claim 1, wherein the information regarding changes in soil texture comprises a map comprising data regarding a soil texture component across the area.

3. The method of claim 1, wherein the information regarding changes in soil texture comprises data regarding electrical conductivity of soil across the area.

4. The method of claim 1, wherein the information regarding changes in soil texture comprises changes in the depth of the digging implement across the area during operation of the harvester.

5. The method of claim 1, wherein the information regarding changes in soil texture comprises changes in a draft force against the digging implement during operation of the harvester.

6. The method of claim 1, wherein the adjustment comprises altering an angle between the digging implement and a soil surface.

7. The method of claim 1, wherein the adjustment comprises altering a linkage between the harvester and a tractor.

8. The method of claim 7, wherein the alteration comprises altering the length of a top linkage of a three point hitch.

9. The method of claim 7, wherein the alteration comprises an alteration to a control arm of a three point hitch.

10. The method of claim 1, wherein the underground crop is peanuts, potatoes, sweet potatoes, beets, ginger, onions, turnips, carrots, rutabagas, or garlic.

11. A harvester comprising:
a digging implement;
an input device configured to accept information regarding changes in soil texture and/or friability across an area to be harvested; and
a control system in communication with the digging implement and with the input device, the control system being configured to automatically adjust an aspect of the digging implement as the harvester passes across the area in response to the information.

12. The harvester of claim 11, further comprising a linkage, the control system being in communication with the linkage.

13. The harvester of claim 12, the linkage comprising an extendable cylinder in communication with the control system.

14. The harvester of claim 11, further comprising one or more digging implement depth gauges, the input device being in communication with the one or more digging implement depth gauges.

15. The harvester of claim 11, further comprising a proximity sensor, the proximity sensor being configured to determine the distance between a portion of the harvester and a ground surface.

16. The harvester of claim 11, the information regarding changes in soil texture and/or friability across an area to be harvested comprising a soil texture map of the area.

17. The harvester of claim 16, the control system being in communication with a geographic positioning system.

18. The harvester of claim 11, wherein the control system is configured to include as an input datum a predetermined operating depth parameter.

19. The harvester of claim 11, wherein the harvester is a peanut digger.

20. The harvester of claim 11, wherein the harvester is configured to harvest one or more of peanuts, potatoes, sweet potatoes, beets, ginger, onions, turnips, carrots, rutabagas, or garlic.

* * * * *

UNITED STATES PATENT AND TRADEMARK OFFICE
CERTIFICATE OF CORRECTION

PATENT NO. : 9,968,027 B2
APPLICATION NO. : 15/209938
DATED : May 15, 2018
INVENTOR(S) : Kendall R. Kirk et al.

It is certified that error appears in the above-identified patent and that said Letters Patent is hereby corrected as shown below:

On the Title Page

(73) Assignee: "Clemson University" should read -- "Clemson University, Clemson, SC (US); Amadas Industries, Inc., Suffolk, VA (US)" --

Signed and Sealed this
Twenty-eighth Day of May, 2019

Andrei Iancu
*Director of the United States Patent and Trademark Office*